P. E. HOLT.
TRACK CHAIN.
APPLICATION FILED SEPT. 26, 1917.

1,344,398. Patented June 22, 1920.

WITNESSES:
Charles Rickles
J.C. Oenesch

INVENTOR
Pliny E. Holt
BY Strong & Townsend
ATTORNEYS

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

TRACK-CHAIN.

1,344,398.   Specification of Letters Patent.   Patented June 22, 1920.

Application filed September 26, 1917. Serial No. 193,376.

*To all whom it may concern:*

Be it known that I, PLINY E. HOLT, a citizen of the United States, residing at Stockton, in the county of San Joaquin and State of California, have invented new and useful Improvements in Track-Chains, of which the following is a specification.

This invention relates to track chains for use in connection with tractors of the self-laying track type.

The present track chain, while of advantage in tractors working in soft or marshy ground, being strong and rugged and affording a maximum of traction surface area, is especially suited for use on artificial roadways, since the shoes or grousers are the reverse of ordinary grousers in that instead of having the usual projections to engage the ground and which are destructive to asphalt and similar roadways, they are provided with depressions, which, while just as efficient as ground grippers on soft ground, will not injure asphalt and like pavements. Moreover, the present track is well adapted for use on side hills or any surface inclining transversely to the tractor, since the shoes or grousers are curved convexly in a transverse direction so as to adapt themselves to such inclinations without liability of working sidewise and getting out of line with the sprocket wheels with the resultant danger of coming off.

One form which my invention may assume is exemplified in the following description and illustrated in the accompanying drawing, in which—

Figure 1:
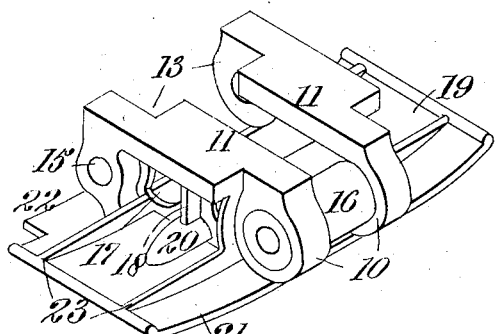
Figure 1 shows a perspective view of one of the links employed in the track chain.
Figure 2:
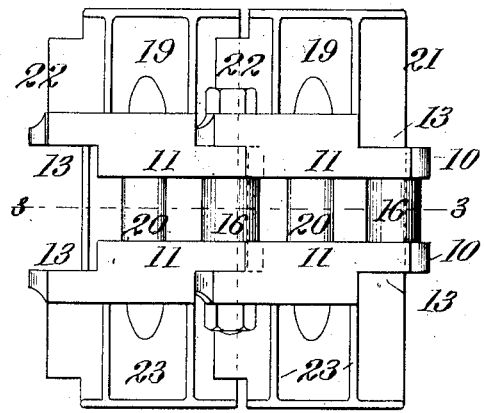
Fig. 2 shows a plan view of two connected links.
Figure 3:
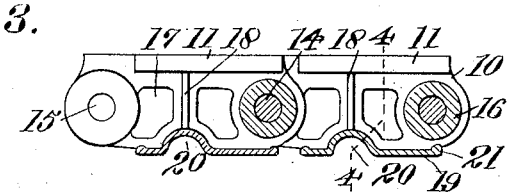
Fig. 3 shows a sectional view taken on the line 3—3 of Fig. 2.
Figure 4:
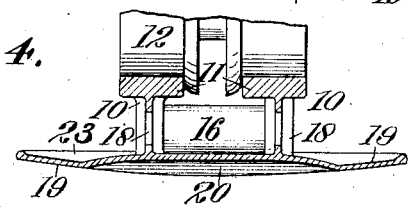
Fig. 4 shows a sectional view taken on the line 4—4 of Fig. 3 showing the link as disposed beneath a fragmentary portion of the truck rollers.

The track chain of this invention is of the endless flexible self-laying type, being made up of a series of articulated link sections, each link section comprising a pair of spaced side bars 10 having their inner longitudinal edges 11 flanged to form rail heads constituting tracks for a roller truck mechanism 12 of a tractor. The flanges are cut away at each end to form recesses 13 located interiorly at one end and exteriorly at the other end of the link. The interior recesses of one link coöperate with the exterior recesses of the adjacent link and the two are connected together by means of a pin 14 passing through apertures 15 in the ends of the side bars and held in place in any suitable way. A gudgeon block or tube 16 is cast in place between the embraced ends of the side bars and forms not only a bearing and housing for the coupling pin, but also a tooth to engage the sprocket teeth of the driving wheel of the tractor.

The central body portion of each side bar is made thin and has apertures 17 at each side of the center. A vertical web 18 is formed on opposite sides of each bar centrally thereof to strengthen and support the overlying flange.

Cast integral with the side bars is a shoe 19 having its greater dimension transversely of said bars, being projected to a considerable distance to either side thereof to form a ground-engaging member of increased width. The shoe is curved convexly in a direction extending transversely of the track, which is lengthwise of the individual shoe, and running longitudinally of the shoe centrally thereof is a concavo-convex depression 20 forming a corrugation to better enable the shoe to grip the ground. Also this depression is so arranged as to constitute a sort of arch to support the vertical webs 18 on the side bars. The shoe in its fore and aft direction is made approximately flat except for the depression 20, the side 21 adjacent the gudgeon block terminating a little short of the ends of the side bars and the opposite side 22 being projected with a slight curvature to overlap the coöperating end of the adjacent shoe to close the interior of the link against the entry of mud or dirt.

Near each end of each link an outwardly and downwardly tapering web 23 is formed extending from the side bar to the outer end of the shoe and constituting a strengthening and reinforcing rib for the projecting end of the shoe.

Due to the fact that the corrugation or ground gripper on the shoe is in the form of a depression rather than a projection, this track is well suited for use upon soft asphalt roadways, such as are encountered on many of the State highways. While effective as ground grippers on soft and marshy ground, these depressions will in no wise injure or deform soft asphalt and like pavements. Also the curvature of the shoe transversely of the track whereby the projecting ends are made higher than the intermediate portion of the shoe adapts the track for use on side hills or other surfaces inclining transversely of the machine. The shoes in such cases will engage the inclined surface over a considerable area at one side and therefore have no tendency to creep sidewise as would be the case if they were made flat and engaged the ground at one edge only. Therefore the track will not get out of line with its sprocket wheels with the resultant danger of coming off.

Another advantage of convexing the tread plate transversely of the track members is that the pressure of the truck rollers on the track when operating on a side hill is distributed and equalized so that the liability of the trucks climbing the track is minimized.

It is also to be noted that the reëntrant grousers or convolutions 20 while of sufficient depth to give the needed traction do not extend the full width of the track but have their terminals lying inside the termini of the tread plates. These convolutions or depressions 20 in addition to providing traction act as a reinforcing web as it were, against the upward buckling of the tread plate.

Having thus described my invention, what I claim and desire to secure by Letters Patent is:

1. A track link comprising spaced side bars, the inner longitudinal edges being formed with rails to support a roller truck mechanism, and a shoe carried on the outer longitudinal edges of the side bars, said shoe having an inward depression extending transversely of the side bars intermediate the ends of the latter, said depression serving as a ground gripper in soft ground, and also as an arch to transmit the weight on the intermediate portion of the said bars to the ends of the shoe when the shoe is traveling on a comparatively hard smooth surface.

2. A track chain made up of a series of articulated link sections, each link section comprising spaced side bars and a shoe carried thereby, said shoe being made substantially flat in a fore and aft direction and having a concavo-convex depression extending laterally to afford a ground grip, said shoe being also curved convexly in a lateral direction and having its greatest dimension transversely of the track and strengthening ribs extending outwardly from the side bars to the ends of the shoe.

3. A track chain made up of a series of articulated link sections, each link section comprising spaced side bars and a shoe carried thereby, said shoe being made substantially flat in a fore and aft direction and having a concavo-convex depression extending laterally to afford a ground grip, said shoe being also curved convexly in a lateral direction and having its greatest dimension transversely of the track and strengthening ribs extending outwardly from the side bars to the ends of the shoe, flanges on the inner longitudinal edges of the side bars forming rail heads and a supporting rib on each side bar extending between the flange and the concavo-convex depression on the shoe, the latter forming an arch to support the rib when the shoe is on the ground.

4. A track link for self-laying track vehicles comprising a tread plate with upstanding rail members on one side of the tread plate, the tread plate having an upwardly formed convolution on its underside projecting upwardly in the direction of the track members to afford traction without injury to road surfaces, the tread plate being convexed in cross section transversely of the length of the track members, and said traction convolution having its terminals within the ends of the tread plate.

5. A track chain made up of a series of articulated link sections, comprising a tread plate having a convex curvature laterally of the shoe, rails formed integral with said plate and in spaced relation to each other, hinged connections formed at the opposite ends of the rails and a concaved rib extending upwardly from the underface of the tread plate and laterally of the link, said rib occurring at a point between the hinged ends of the rails and terminating short of the sides of the plate, whereby the rails and plate will be reinforced and a reëntrant grouser member provided.

In testimony whereof I have hereunto set my hand in the presence of two subscribing witnesses.

PLINY E. HOLT.

Witnesses:
JOHN H. HERRING,
GENEVIEVE E. DONELIN.